Patented May 16, 1939

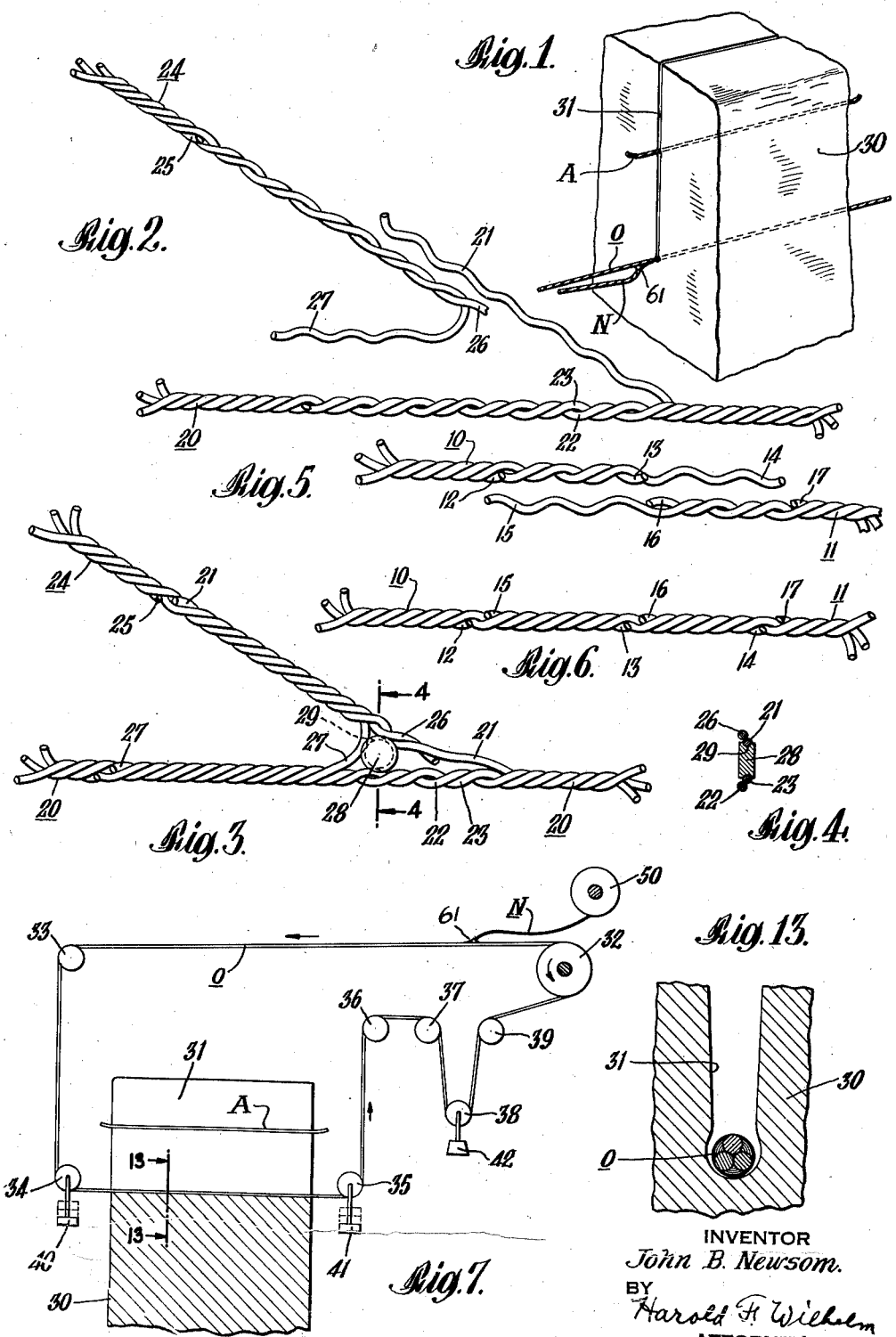

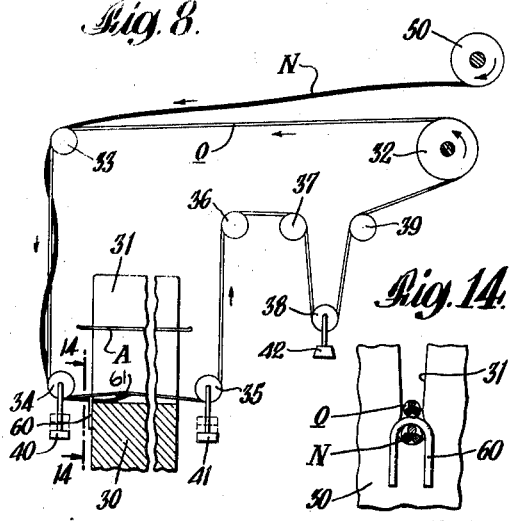
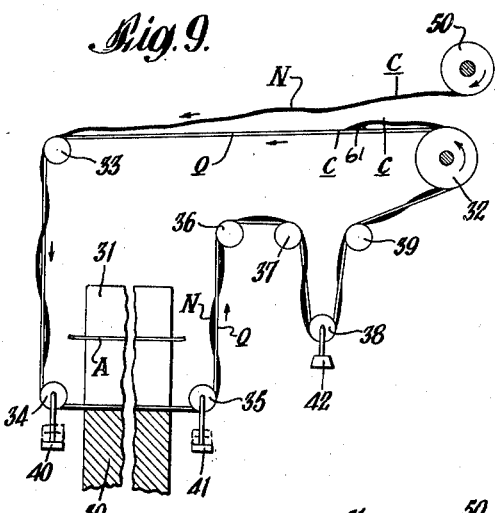
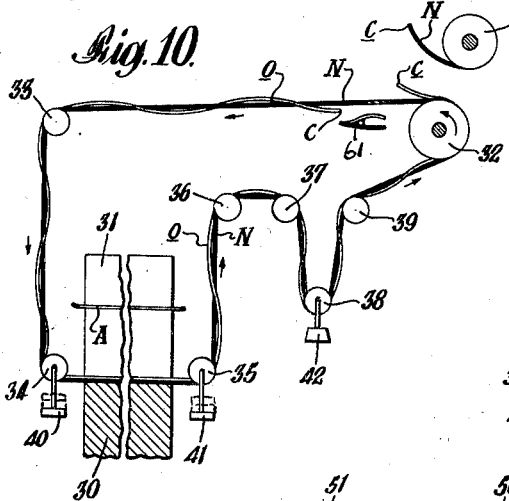
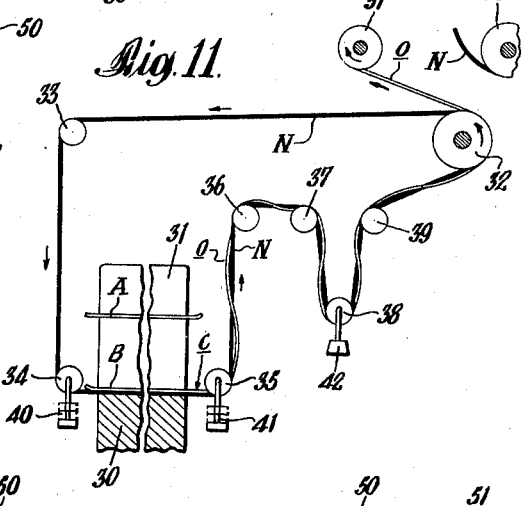
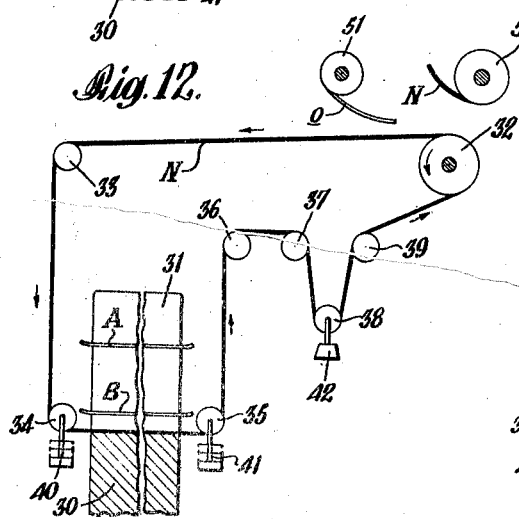
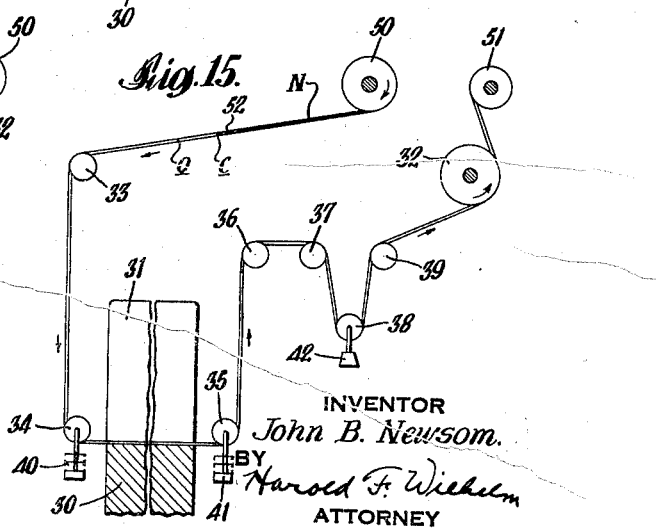

2,158,830

UNITED STATES PATENT OFFICE 2,158,830

WIRE SAWING

John B. Newsom, Palo Alto, Calif.

Application February 18, 1938, Serial No. 191,164

9 Claims. (Cl. 125—21)

This invention relates to wire sawing and, more particularly, to apparatus for, and a method of, running in a new saw in an old cut. The invention is particularly applicable to the method of quarrying disclosed in my patent No. 2,050,761, patented August 11, 1936, although it is not limited to such method.

As a wire saw cut deepens, the wire naturally wears and the cut naturally becomes smaller. If a wire breaks due to excessive wear, it is customary to substitute a fresh wire. It is difficult to thread into an old cut a new wire of the same size as the original size of the old wire, as the new wire wedges against the walls of the cut as it is forced down to the bottom of the cut. For this reason, it has heretofore been proposed to use progressively smaller fresh wires, and correspondingly less tension for the cutting. But it is even difficult to thread in a smaller wire from the top because of the peculiar shape of the walls of the cut. Furthermore, the use of less tension naturally slows up the cutting. This problem is not especially acute with low cuts, but presents considerable difficulties as the cuts become deeper.

According to one feature of the present invention, it is proposed to replace the old wires, before they wear badly enough to break, with full size fresh wires. Before introducing a new wire, the old wire may be run idly with cutting pressure removed so as to ream out a hole of a diameter greater than the cut. This increased diameter accommodates a full size wire.

According to the invention, the new full size wire may be introduced by securing the new wire to a point intermediate the length of the old wire. The saw may then be used to place the new wire in the cut and to properly position it on the wire sawing apparatus. If desired, the old wire may be left in position to act as a free or safety wire to be used in case of emergency.

If it is not desired to place a series of free or safety wires in the ledge for emergency purposes, the old wire may be cut and the new wire spliced directly onto the end of the old wire. The wire saw may then be used to pull the new wire into position, the old wire being wound up on a drum and the new wire being unwound from its drum.

A further feature of the invention constitutes a special delta splice for connecting the new wire to the old wire by which the new wire is fed through the cut in proper position under the old wire.

The invention also consists in certain new and original features of construction and arrangement and combination of steps hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which:

Fig. 1 represents diagrammatically a section of ledge with the wires in position;

Fig. 2 illustrates the arrangement of the wires making up the delta splice before connection;

Fig. 3 illustrates the delta splice;

Fig. 4 is a section on the line 4—4 of Fig. 3;

Fig. 5 illustrates the manner in which the wires are cut before forming an ordinary splice;

Fig. 6 represents an ordinary splice;

Fig. 7 illustrates diagrammatically an arrangement for wire sawing a vertical cut in a ledge with the fresh wire ready to be started into position;

Figs. 8–12, inclusive, represent various steps in the process of feeding the fresh wire into position;

Fig. 13 is a section on the line 13—13 of Fig. 7;

Fig. 14 is a section on the line 14—14 of Fig. 8; and

Fig. 15 represents a modified method of feeding in a new wire.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings and, more particularly, to Figs. 5 and 6, a simple splice used for connecting the ends of wire saws together will be described. Such splices in themselves are old, but they are explained here to assist in a better understanding of the invention. The saw wires to be connected are indicated by 10 and 11. Each wire is made up of three strands twisted together, as will be understood by those skilled in the art.

The strands of wire 10 are cut in such manner that strand 12 does not project from the body of the wire at all; strand 13 projects as shown in Fig. 5 and strand 14 projects still further. In the same manner wire 11 is cut, the strands being cut as indicated at 15, 16 and 17. The wires are spliced together by twisting the projecting strand 14 about strands 15 and 16 to take the place of the cut portion of strand 17. Similarly, strand 15 is twisted about strands 13 and 14 to take the place of the cut part of strand 12. The finished splice will appear as indicated in Fig. 6 and will have a diameter uniform with the diameter of the continuous part of the wire.

Referring now to Figs. 2–4, my special delta splice will be described. The old wire is indicated by 20 and the new wire by 24. The wires are prepared as illustrated in Fig. 2 for connecting the end of new wire 24 to the length of old wire 20.

The old wire 20 has strand 21 cut and bent upwardly therefrom as shown in Fig. 2, leaving the other two strands 22 and 23 to maintain the continuity of the wire. New wire 24 has strand 25 cut back close to the body of the wire. Strand 26 projects a distance from the body of the wire corresponding to the length of the free part of strand 21 and strand 27 projects beyond strand 26 a distance corresponding to the part of wire 20 from which strand 21 is bent.

The strands are twisted together as indicated in Fig. 3 with strand 21 twisted about strands 26 and 27 to take the place of the part of strand 25 that is cut away. Similarly, strand 27 is wrapped around strands 22 and 23 to take the place of that part of strand 21 which has been bent away.

The joint has a delta shape as indicated in Fig. 3. To prevent the delta from collapsing, a button 28 having a peripheral groove is provided, if desired. This button is forced tightly inside the delta with the strands 21, 26, 27, 22 and 23 seated within the groove 29 as illustrated in Figs. 3 and 4. The utility and advantages of this construction will be apparent as the description proceeds.

Referring now to Fig. 7, which illustrates a diagrammatic layout of a wire saw making a cut in a ledge, the ledge is indicated by 30 and may be of considerable height running up to, say, seventy-five or one hundred feet. The saw cut is indicated by 31 and may extend for a length across the ledge in the neighborhood of, say, one hundred feet. The old wire saw is denoted by O and the new wire saw by N.

New wire N is illustrated by the dark line and old wire O by the light line in Figs. 7–12 and in Fig. 15.

The old wire saw O is mounted upon a driving pulley or sheave 32 driven by a suitable source of power (not shown). This wire runs over pulleys 33 to 39 inclusive. Pulleys 33 and 36 may be described as idler pulleys leading the saw in the proper direction. Pulleys 34 and 35 are the feed pulleys for guiding the saw through the cut. Suitable devices, such as weights 40 and 41, may be provided for giving the necessary downward pressure to the saw for making the cut. These pulleys 34 and 35 are conveniently mounted in guides, as in my above mentioned prior patent. These guides are omitted in this drawing for purposes of simplicity.

Pulleys 37, 38 and 39 and weight 42 illustrate diagrammatically a tensioning device for keeping the wire under proper tension and for providing more wire as the cut deepens. It will be understood that the pulleys are of standard construction used in wire saw work. Any desired type of tensioning device may be used. The fresh wire N is wound on a roll 50 mounted upon suitable trunnions.

In Figs. 1 and 7, the safety wire A has been left in the cut after having been replaced by the wire O according to the invention. The wire O has cut the additional distance and has now worn down to the point indicated in Fig. 7 where it is desired to replace it with a fresh wire N. The cutting action of old wire O (before fresh wire N as attached) will be clear to those skilled in the art.

To substitute the new wire N, the pulleys 34 and 35 are blocked in position, leaving them free to rotate, but preventing further downward movement. The tensioning device 38, 42 is also rendered inoperative to reduce tension on the wire O.

With the tension device and the sheaves 34 and 35 blocked, the wire only cuts enough after that to remove the strain actually in the wire. Sufficient tension will remain in the wire to supply the necessary driving friction between drive sheave 32 and the wire. The wire soon reaches a point where sand particles, which carry under it, will raise the wire instead of cutting the rock, after which it begins to enlarge the bottom of the cut and stops going down. Here, the position of the wire is substantially stationary. There will be enough lateral play in the comparatively slack wire to ream out the cut 31 at this point, increasing the diameter thereof to a size equal to or, if desired, greater than the size of the original wire. This action is illustrated in Fig. 13 which also shows in an exaggerated manner, the gradually decreasing width of the cut due to the wear of the old wire.

After a hole of sufficient size is reamed out, the old wire O is stopped and the new wire N is spliced to the old wire by the delta splice described above. This splice is indicated by 60 in Figs. 7–10. The old wire O is then run slowly, pulling the new wire N with it. A workman may be sent to feed in the new wire N into the cut 31 under the old wire O. It is important that the old wire be on top since, otherwise, in the subsequent operation of cutting by the new wire, it would cut through the old wire. One manner of keeping the wires straight follows:

The workman hangs a staple 60 made of one inch round steel over the new wire and under the old one. As the pulling through progresses, this staple is carried against the face of the rock and keeps the wires straight at this point. To make it easier, just before the splice enters the rock, the two pulleys 34 and 35 are backed up enough to raise the old wire about an inch and a half where it enters the cut, thus providing a free space for the new wire to start through. The saw is run slowly during the entire operation and the attendants watch the entering wires all the time, thus catching any possible snarl at the rock face before it gets serious. Snarls do not develop often, and they can be easily straightened out, for both wires are fairly tight. Once the wires are entered correctly, they will go through without twisting, as the cut is too narrow for the delta splice to twist.

As the wire is pulled along, it will twist around the old wire anterior to the cut, as illustrated in Fig. 8, this figure also illustrating, in an exaggerated way, the procedure of the delta splice through the cut. The feeding then proceeds until the delta splice reaches the position shown in Fig. 9. The new wire will also twist around the old wire posterior to the cut, as shown in Fig. 9. The delta splice is cut loose at three points, as indicated by C in Fig. 9. The new wire N is also cut from the roll 50 and its ends are spliced together by the splice indicated in Figs. 5 and 6. The condition of the wires is then as illustrated in Fig. 10. Now the new wire is tied in the saw and the old wire hangs loosely around the new wire. The saw is then started slowly until the posterior end of the old wire reaches the position adjacent the ledge as illustrated in Fig. 11. The fact that the old wire is twisted around the new wire carries the former along and, as it is carried along, it is rolled up on a reel 51 operated in any suitable manner. With the posterior end of the old wire in the position shown in Fig. 11, the old wire is cut on the other side of the ledge at the point indicated by C. Thus, the old wire O is left in position above the new wire N in the cut 31.

After the length of old wire, indicated by B, is severed, the wire saw is again started slowly with the remaining part of the old wire being wound up on reel 51, as indicated in Fig. 12. We are now ready to proceed cutting with the new wire, the blocking of sheaves 34 and 35 being removed for the resumption of the cutting operation, and the tensioning device 38, 42 placed back in operation.

Thus, a method has been described which greatly facilitates wire sawing, especially on high cuts. The old wires are replaced by fresh wires before they become so weak that they break. Wires are replaced when they wear down to such an extent that no sand can be carried in the grooves formed by the strands. Thus, breaking the wires will be caused by pure accident. If by accident a cutting wire does break and a broken end is pulled out of the cut, it is only necessary to splice the ends of the broken wire to the ends of the last free or safety wire A left in the cut. From this point there are two alternative procedures depending upon operating conditions.

First, if the cutting wire is still reasonably fresh, the free section just spliced in may be removed after the cutting wire is pulled through the cut. The cutting is then resumed in the regular way since the wire, being worn to correspond with the reduced width of the cut, can be worked to the bottom of the cut with a minimum of trouble, although, due to the irregular surface of the walls of the cut, some difficulty in working a wire down in an old cut is bound to occur.

Or, alternatively, the cutting wire may be treated as a worn out wire and replaced by an entirely fresh wire. In this case, the old wire with the free section just spliced in may be left in operation until the saw reaches the bottom of the cut. Then the saw may be run idly to ream out an enlargement and a fresh wire may be fed into position in the manner described above.

The delta splice is of great convenience in feeding the new wire through the cut in proper relation to the old wire. The wires cannot twist in the cut because the delta splice has been made flat and is large enough to hold rigidly the wire in proper Y-configuration when starting at, and passing through, the cut. The bracing action obtained by the strand 27 and the use of the button 28 maintains the delta splice in proper angular relation and prevents the new and old wires from collapsing together.

The critical point for twisting is at the delta splice. If some means were not provided to hold the new and old wires apart at this point, the wires might twist around at any enlargement in the bottom of the cut. If this occurred, the fresh wire would saw through the old wire upon resumption of the sawing operation and the purpose of leaving the free wire in the cut would be defeated.

However, if the wires are kept from twisting at the delta splice when the latter passes through the cut, the cut is narrow enough to maintain the wires in proper relation once the fresh wire is threaded through without twisting in the cut. So if the fresh wire is fed into the cut under the old wire, it will retain its proper position under the old wire even though the old and new wires may be twisted anterior to the cut and even though the old and new wires may twist posterior to the cut, as indicated in Fig. 9.

Thus with the present process the chances of breaking a wire due to excessive wear are greatly reduced because they are replaced at timely intervals. These replacements may occur at various points depending upon conditions. For example, in making a deep cut of, say, fifty to one hundred feet deep, a free wire may be left in position in the ledge at, say, every ten feet. If a wire does accidentally break, a free wire is always conveniently available already threaded into the cut for assisting in rethreading the wire into the cut.

Referring now to Fig. 15, in case it is not desired to leave the free or safety wires in the cut, the fresh wire may be pulled through the cut by attaching its anterior end to the posterior end of the old wire. In this case, the old wire will be run idly in the cut to ream out a larger hole in the same manner as described in connection with Figs. 7–12.

Here, after reaming the larger cut, the saw will be stopped and the old wire O cut some distance from the drive sheave 32 as at C in Fig. 15. The anterior end of new wire N wound on drum 50 is then spliced, for example, by the splice of Figs. 5 and 6, to the posterior end of old wire O as at 52. The anterior end of the old wire O is started on wind-up drum 51. The saw is then started slowly, the old wire pulling the new wire over the pulleys and through the cut, the new wire unwinding from drum 50 and the old wire winding up on reel 51. When the old wire is completely reeled up, the anterior end of the new wire is severed from the posterior end of the old wire, and the posterior end of the paid out part of the new wire is severed from the reel 50 and spliced to the anterior end of the new saw.

While certain novel features of the invention have been disclosed and are pointed out in the annexed claims, it will be understood that various omissions, substitutions and changes may be made by those skilled in the art without departing from the spirit of the invention.

What is claimed is:

1. The method of wire sawing a ledge which comprises cutting with a wire until the wire wears down to a predetermined size, removing cutting pressure from the wire, running the wire idly to enlarge the cut, feeding into the enlarged cut under the old wire a new wire of a size greater than that to which the old wire has been worn, applying cutting pressure to the new wire and resuming cutting therewith, leaving the old wire in position, until the second wire wears down to a predetermined size, and thereafter repeating the steps aforesaid until the cutting is completed.

2. The method of wire sawing a ledge which comprises cutting with a wire until the wire wears down to a reduced size, removing cutting pressure from the wire, running the wire idly to enlarge the cut at that point, feeding into the enlarged cut a new wire of a size greater than that of the worn wire and resuming cutting with the new wire.

3. The method of wire sawing a ledge which comprises making a cut with a wire saw, discontinuing the feed of said wire saw before it wears through enough to break, enlarging the width of the cut at this point and feeding into the enlarged cut a new wire of a diameter greater than the diameter of the worn wire.

4. In a wire saw system having a wire disposed in the cut, pulleys and a driving wheel supporting the wire saw, the method of threading in a new wire when the old wire becomes worn, which comprises stopping the downward feed of the old wire in the cut, running the old wire idly to ream out an opening larger than the adjoining cut, connecting the end of the new wire to a point on the old wire anterior to the cut and intermediate the length of the old wire, feeding the old wire and dragging the new wire along therewith, placing the new wire under the old wire where it passes through the cut, continuing the feed of the old wire until the new wire reaches the point of beginning, severing the new wire from the old wire, splicing the new wire, severing the old wire, running the new wire and reeling the old wire onto a drum, stopping the feed when the posterior end of the old wire is near the cut, severing the old wire near the point where it leaves the cut, continuing to run the new wire and continuing to wind the old wire onto said drum.

5. The method of cutting a ledge with a wire saw, including a cutting wire, a drive sheave and guide pulleys for the wire which comprises cutting with the wire until the wire wears down to a predetermined size, removing cutting pressure from the wire, running the wire idly to enlarge the cut, severing the old wire at a point anterior to the drive sheave, attaching the anterior end of a fresh wire onto the posterior end of the old wire, running the saw to pull the fresh wire into position, paying out the new wire and winding up the old wire until the anterior end of the new wire reaches the point of beginning, severing the new wire from the old wire and from the part of the new wire remaining on the drum, splicing the ends of the new wire together, and resuming the wire sawing operation.

6. In a wire sawing system for a quarry having a wire saw cut, an old wire in the cut, a new wire to be fed into said cut, and a three-branch connection between the end of said new wire and a point intermediate the length of the old wire, said wires defining a Y-configuration.

7. In a wire sawing system for a quarry having a wire saw cut, an old wire in the cut, a new wire to be fed into said cut, a three-branch connection between the end of said new wire and a point intermediate the length of the old wire, and a supporting member having a peripheral groove fitted into the arms of said three-branch connection to assist in holding said wires apart at said connection to prevent twisting of said wires in said cut.

8. In a wire sawing system for use in a quarry having a wire saw cut, an old wire in the cut, a new wire to be fed into said cut, the end of the new wire being connected to a point intermediate the length of the old wire to define a Y-configuration, said wires each comprising a plurality of strands, certain of the strands of each wire being cut and bent away from the body of the wire, leaving reduced body portions, the bent strands of each wire being twisted around the reduced body portions of the other wire.

9. A wire saw joint between the end of a first wire and an intermediate point of a second wire, each wire comprising three strands twisted together, a part of one strand of said second wire being cut and untwisted from the body of the wire, the strands of said first wire being cut at successively different points, one strand of said first wire terminating at the body of the wire, the other two strands being twisted together a distance corresponding to the untwisted strand of the second wire, the one strand of said first wire being free and projecting beyond the second strand a similar distance, the two strands of said first wire and the free strand of said second wire being twisted together and the free strand of said first wire being twisted around the reduced body of said second wire, said free strands, when twisted into position, supplementing the missing strands, the free strand of the first wire and the free strand of the second wire, together with the reduced body of the second wire, forming a delta shaped portion, and a button having a peripheral groove fitted into said delta portion.

JOHN B. NEWSOM.